(12) United States Patent
Cooper

(10) Patent No.: US 6,870,964 B1
(45) Date of Patent: Mar. 22, 2005

(54) SPATIAL SCAN REPLICATION CIRCUIT

(75) Inventor: Carl Cooper, Monte Sereno, CA (US)

(73) Assignees: Pixel Instruments Corporation, Los Gatos, CA (US); IP Innovation LLC, Northbrook, IL (US)

( * ) Notice: Subject to any disclaimer, the term of this patent is extended or adjusted under 35 U.S.C. 154(b) by 0 days.

(21) Appl. No.: 09/573,284

(22) Filed: May 18, 2000

Related U.S. Application Data

(62) Division of application No. 08/398,383, filed on Mar. 3, 1995, now Pat. No. 6,529,637, which is a continuation-in-part of application No. 08/119,610, filed on Sep. 13, 1993, now Pat. No. 5,424,780, which is a continuation of application No. 07/355,461, filed on May 22, 1989, now abandoned.

(51) Int. Cl.[7] .................................................. G06K 9/40
(52) U.S. Cl. ........................ 382/254; 382/267; 348/607; 358/1.2

(58) Field of Search .................................. 382/205, 254, 382/258, 260, 299, 300, 267, 266, 307; 348/607, 616, 625, 245, 246, 267, 269; 358/426.1, 1.2, 3.07, 3.27

(56) References Cited

U.S. PATENT DOCUMENTS

| | | | | |
|---|---|---|---|---|
| 4,573,070 A | * | 2/1986 | Cooper ........................ 358/36 |
| 4,684,985 A | * | 8/1987 | Nakagaki et al. ............ 358/140 |
| 4,989,090 A | * | 1/1991 | Campbell et al. ............ 358/140 |
| 5,146,333 A | * | 9/1992 | Chaplin ....................... 358/182 |
| 5,182,633 A | * | 1/1993 | Antonio et al. ............... 358/11 |
| 5,504,815 A | * | 4/1996 | Ryan et al. .................. 348/663 |

* cited by examiner

Primary Examiner—Yon J. Couso

(57) ABSTRACT

In an image replication circuit, the improvement of replicating a given element at a certain location with the most similar of surrounding sets of image elements.

38 Claims, 5 Drawing Sheets

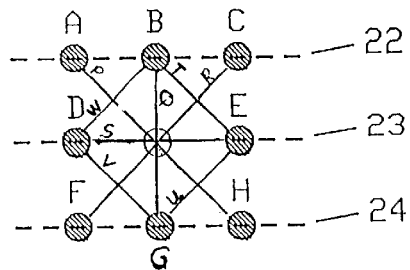

X FILL DIRECTION(S):

| | | |
|---|---|---|
| VERT. | IF | \|B-G\| < \|A-H\| or \|C-F\| or \|D-E\| or \|B-E\| or \|E-G\| or \|G-D\| or \|D-B\| |
| HORIZ. | IF | \|D-E\| < \|B-G\| or \|A-H\| or \|C-F\| or \|B-E\| or \|E-G\| or \|G-D\| or \|D-B\| |
| R. DIAG. | IF | \|C-F\| < \|B-G\| or \|A-H\| or \|D-E\| or \|B-E\| or \|E-G\| or \|G-D\| or \|D-B\| |
| L. DIAG. | IF | \|A-H\| < \|B-G\| or \|C-F\| or \|D-E\| or \|B-E\| or \|E-G\| or \|G-D\| or \|D-B\| |
| U. LEFT | IF | \|D-B\| < \|B-E\| or \|E-G\| or \|G-D\| or \|B-G\| or \|A-H\| or \|C-F\| or \|D-E\| |
| U. RIGHT | IF | \|B-E\| < \|E-G\| or \|G-D\| or \|D-B\| or \|B-G\| or \|A-H\| or \|C-F\| or \|D-E\| |
| L. LEFT | IF | \|E-G\| < \|G-D\| or \|D-B\| or \|B-E\| or \|B-G\| or \|A-H\| or \|C-F\| or \|D-E\| |
| L. RIGHT | IF | \|G-D\| < \|D-B\| or \|B-E\| or \|E-G\| or \|B-G\| or \|A-H\| or \|C-F\| or \|D-E\| |

FIGURE 7

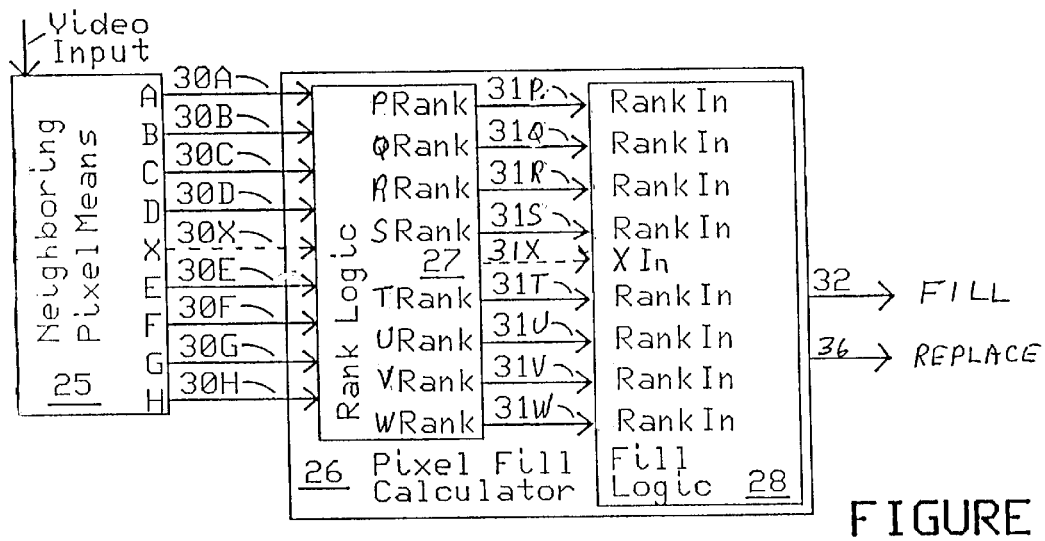

FIGURE 8

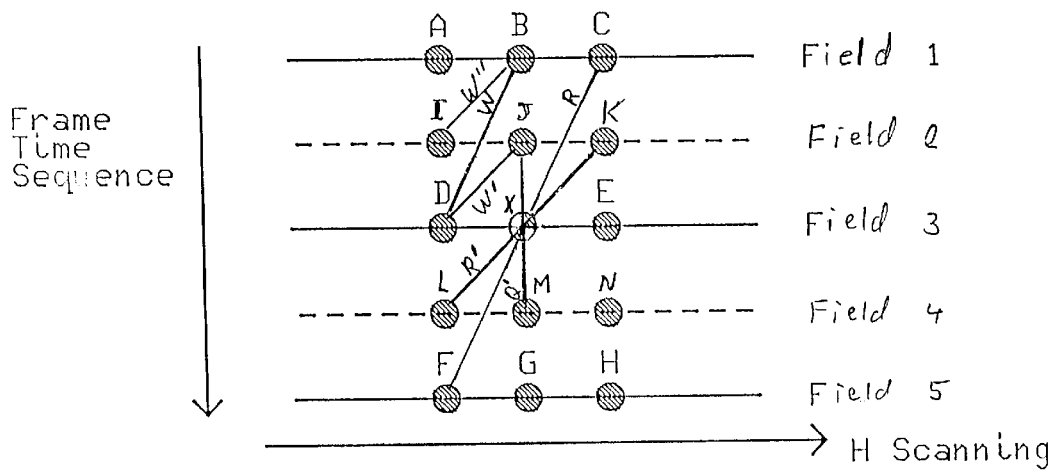

FIGURE 9

SPATIAL SCAN REPLICATION CIRCUIT

The present application is a division of U.S. Ser. No. 08/398,383 filed Mar. 3, 1995 (now U.S. Pat. No. 6,529,637 issued Mar. 4, 2003) which claims the benefit of and is a continuation-in-part of application U.S. Ser. No. 08/119,610 filed Sep. 13, 1993 (now U.S. Pat. No. 5,424,780 issued Jun. 13, 1995) which claims the benefit of and is continuation of application Ser. No. 07/355,461 filed May 22, 1989 (now abandoned) priority of these applications is herein claimed.

FIELD OF THE INVENTION

An apparatus and method is shown for modifying the creation and/or presentation of image information displayed, printed or created on a raster or matrix image or graphic display or printer, thereby increasing the apparent image quality. Means for deriving a plurality of neighboring image elements or elements of the video signal which neighbor in time or space to a common location, and means for determining the image elements replication at such location in response thereto, are also shown. Particular embodiments relation to increasing the apparent temporal and spatial resolution of raster scanned television computer and permanent copy devices are shown.

BACKGROUND OF THE INVENTION

This invention relates to increasing the apparent temporal or spatial resolution of a created and/or displayed image which is typically produced by ordered groups of elements such as by a raster or matrix element or device, without a required increase in the number of image elements of the image. The application is a continuation-in part- of the copending U.S. application Ser. No. 08/119,610 filed Sep. 13, 1993 for Apparatus and Method for Spatial Scan Modulation of a Video Display which U.S. Pat. No. 119,610 application is a continuation of U.S. Pat. No. 355,461 filed May 22, 1989—now abandoned. The Notice of Allowance for the U.S. Pat. No. 119,610 application was mailed to the applicant on Dec. 22, 1994 and the issue fee has been paid. The content of this U.S. Pat. No. 119,610 application is incorporated by reference.

DESCRIPTION OF THE PRIOR ART

As television, computer, graphics, printers, fax machines and related image technology develops, there is increasing emphasis on improving the quality of created, displayed, or stored images in order that they appear more real and pleasing to the human observer. Two of the parameters which affect image quality, and therefore are subject to improvement, are spatial and temporal resolution. Spatial resolution, simply put, is the number of image elements which are used to make up an image, normally static, and correspondingly, temporal resolution is the number of elements per unit time which make up an image, normally moving. Desirable qualities of an image system, such as television camera, scanner, broadcast television, computer display printer, permanent copy device, etc. will ideally include having as many elements per image or frame and, in the case of moving images, as many elements or frames per unit time as is economically feasible. Unfortunately, increasing the number of image elements per frame or the number of frames per second is a costly improvement. Therefore many schemes have been developed to improve the resolution of the image, while reducing the number of elements used.

Other improvement systems, such as various Scanner Interpolation Techniques, improved Definition Television Systems (IDTV), Advanced Television Systems (ATV), and High Definition Television Systems (HDTV), Hewlett Packard's Laser Printer Resolution Enhancement System, and other Image Enhancers typically operate to increase the resolution and other quality related aspects of image systems. Many of these systems resort to various techniques for such quality improvements, some of which generate unwanted artifacts.

OBJECTS AND SUMMARY OF THE INVENTION

It is an object of this invention to provide an apparatus and method for improving the apparent quality of a created and/or displayed image by altering the size, shape or position of the elements of the image.

It is an object of this invention to allow usage of a low resolution camera and/or recorder in a high resolution video distribution and/or display system.

It is another object of this invention to provide an apparatus and method to alter the size, shape or position of the elements of a scanned or presented image in response to the relationship between a plurality of elements of the image.

It is a yet further object of this invention to provide a means and method for inspecting a plurality of elements of an image to determine the presence of a need for filling of areas between the elements.

It is yet another object of this invention to provide a means and method for simultaneously providing a plurality of elements of said image for inspection and comparison means to determine proper altering of areas between the elements or voids created by defective or unneeded elements.

It is an additional object of this invention to provide a means and method for inspecting a certain element or location with respect to one or more surrounding or neighboring elements of an image to determine the desirability for changing the shape, position or size of other elements to improve the spatial and/or temporal resolution relationship between the elements, which may neighbor in time or space.

It is an additional object of this invention to provide a means and method for inspecting neighboring elements with respect to one or more other elements of an image to determine a need for changing the shape, position or size of elements to improve the spatial or temporal resolution relationship with the other elements, especially when one other element is defective.

It is yet still another object of this invention to provide a means and method to improve the quality of an image by inspecting a plurality of neighboring elements to generate replication elements in response thereto.

It is a further object of this invention to provide a means for replicating non-defective image elements while producing no ascertainable artifacts.

It is still yet another object of the invention to apply the above objects to any physical phenomena or signal which can be represented as a matrix of discrete elements.

It is still another object of this invention to provide an image creation device utilizing the above objects.

According to an aspect of this invention, the inventive concepts disclosed herein show an apparatus and method for modifying the creation storage and/or production of an image by device in response to the image content thereof as carried by an image bearing signal, in order to create an image having apparently higher quality than normal.

The preferred embodiment of the present invention describes a neighboring element means for providing a plurality of neighboring elements, and an element replication means responsive to said plurality of neighboring elements to selectively fill a location, which may be a void, or artifacts, between elements, or to replace elements in the spatial or time dimensions or both. The inventive concepts disclosed herein may be utilized to improve the apparent resolution of the created and/or displayed image spatially, temporally, or both, or to conceal, by replication including modification, and/or creation of otherwise non-existent, defective or unneeded image elements or artifacts. The invention will find considerable use in the reduction of spatial or temporal (motion) artifacts of improved television systems like HDTV.

It will be understood that the term image as used herein is meant to apply to the creation and/or presentation of any phenomena by a raster or matrix of discrete or adjoining elements, and that the raster or matrix may be either a single one, or a given one of a plurality or sequence of rasters or matrices, for example as used in temporal portraits of such physical phenomena. The image can be visible on a display (such as a computer monitor or regular television set), viewable after creation (such as a laser printer or fax machine) or otherwise exist (such as in memory for subsequent use or on a recorder tape). The term image is applicable to the creation of an image (for example at a low resolution to camera); on recording (for example on a VHS machine for HDTV transmission), on receipt (for example NTSC reception on an HDTV monitor) or otherwise.

It will be further understood that invention has application to a group, or series of such elements, whether transmitted or stored, in time sequential or parallel arrangement or in any other form. The more important aspect of the invention is the operations on the elements which have some spatial or temporal coherence or probability of similarity. It is of lesser importance what the elements represent or how the elements are conveyed, or of the particular nature or make up of the form of the elements.

It will be also understood that although the word void is used in this specification, the invention is directed towards replicating new image information utilizing neighboring image elements, which new image information is utilized at a certain location(s). These locations might or might not have previously had image information available therefor. The void may exist at the point of image creation, before/after storage and/or at the point of presentation. Examples of voids would include such things as defects, unwanted elements, improper elements, corrupted elements, valid but replaceable elements, locations with no image information, and/or other locations or elements which may be in question or need for improvement. The term void is used to cover all these and similar situations for uniformity.

It will also be understood that although the word combination "filling in" is used in the specification and claims, the invention is directed towards replicating an image element at a particular location—again, an image element which might or might not have previously had information available therefor. This replication includes creating, modifying, replacing, substituting, adding to, providing and/or filling in for the element at this location. This term filling in is used to cover all these and similar situations for uniformity.

It will also be understood that although the word "similarity" is used in the specification, the invention is directed towards the use of any of the various element characteristics to determine similarity, which characteristics can be used alone or in combination thereof. For example, the elements both may be of the same color, but of different brightness; they both may be of same brightness, but of different hue; they both may be of the same luminescence but of different color saturation; they both may be of same saturation and luminescence; they both may be the same size; they both may have the same relationship to their surroundings; or otherwise be similar in some one or combination of characteristics. Characteristics by which similarity can be determined include color, hue, color saturation, luminescence (brightness), size, detail, pattern, spacial frequency component in horizontal or vertical or diagonal or time or other dimensions, temporal frequency, content, relationship of neighboring elements, noise, and/or other external measures such can be derived from a detection circuit which would provide a flag or measure and/or other indication that an element or group of elements are suitable for processing. The element or location which is being processed may or may not be a valid or erroneous element: It might even have had no image information or not previously existed.

It will also be understood that although the word "replication" is used in the specification, the invention is directed towards modifying, correcting, improving, substituting for, adding to, replacing or otherwise processing the image so as to provide for an overall, more pleasing or apparently higher quality image. As previously set forth the word "fill in" is used in this specification for similar attributes as replication.

It should be understood that the word "surrounding" is used in this specification to describe elements which have some relationship to other image elements, be the relationship spacial or temporal. The word surrounding could include elements which are neighboring on one side thereof, neighboring on all sides, adjacent thereto, spaced from diagonally with intervening elements between (such as in a interlaced field scan device wherein alternating fields are paired), immediately adjacent or spaced elements which have a statistical ability of being similar, or merely elements that have a greater than minimal statistical probability of being similar. However, in respect to this latter it is preferred that the percentage of similarity, is over 50%.

It should be understood that the invention has application during the creation of an image (for example at a video camera), at the storage of an image (for example before or after a video tape or disk) and/or in the production of an image (for example a video monitor).

The objects and features of the invention will be apparent to one skilled in the art from a consideration of the following description and claims, when read in conjunction with the accompanying drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein:

FIG. 7 shows a group of nine neighboring image elements which may be operated on by the present invention.

FIG. 8 shows a diagram of the present invention including the use of a ranking means.

FIG. 9 shows a diagram of 15 elements taken from scan line of 5 successive image fields.

DETAILED DESCRIPTION OF THE INVENTION

Figure 1:
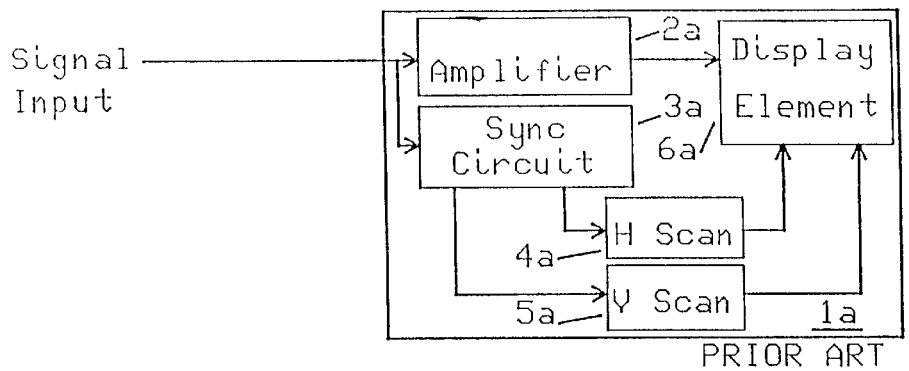
FIG. 1 is a block diagram of a typical prior art image generating device.

FIG. 1 is a block diagram of a prior art image display device 1a which may be improved by the addition of the present invention. The invention is set forth in its preferred embodiment in primary reference to a image display, in this specification a video display. However, this device may be any of those which are well known in the art which create, store and/or convey physical phenomena by use of ordered groups of elements, such as various matrix and raster type displays or hard copy generating display devices such as various cameras, scanners, televisions, laser printers, fax machines and the like. For the purpose of the present description and explanation it will be primarily presented with the device 1a that is a raster scanned display such as an electron beam scanned CRT or a laser scanned photo sensitive surface operating in a progressive (non-interlaced) mode. This device may also operate in interlaced fashion as will be apparent from the present disclosure and in other creation, recording and presentation forms. However for the purpose of the present explanation of the invention, by way of example, it will be assumed that it is a video display operating in a progressive mode.

This display device normally contains an amp 2a which receives, clamps, amplifies and couples the signal to the display element 6a, which is most commonly a CRT or modulated laser but which also could be modulated LED's or LCD's or other image creation device.

The device shown is a video device also contained in the device 1a is a sync circuit 3a which receives the signal, strips the composite sync therefrom, separates the composite sync into H and V components and couples these components to the H scan 4a and V scan 5a circuits respectively. The scan circuits 4a and 5a provide the scanning control of the display element 6a, for example by providing the ramp drive waveforms to the CRT yoke or displacing the laser beam, or modulating the imaging devices suitable modifications would have to be made for an image creation device like a camera.

It will be recognized by one skilled in the art that the device shown by way of simple example in FIG. 1 has many practical variations which are commonly used. The single connecting lines shown between elements will be understood to carry multiple signals as required, and other configurations may be made. For example, the sync circuit 3a is sometimes configured to receive one or more sync waveforms separate from the image signal. The actual scanning process may be by alternate methods as well, operating in progressive or interlaced fashion, including magnetic and electrostatic deflection of an electron beam such as in a CRT or E.B. recorder, electro-optical or mechanical deflection of a light beam such as in a laser projector, fax machine, printer or electro-optic display device, or by address or pixel selection as with thermal, ink jet, flat panel, florescent, LED or LCD type displays or printers. The device might also be an image creation device, whether video tube, CCD or otherwise. Further the processing may occur at imaging prior to recording, after recording, in or out of memory or at any other time the image information is available.

One skilled in the art will be able to utilize the present invention with any of the many image creation, recording, memory and/or display devices which utilize ordered groups of image elements to eventually set forth image phenomena as are known in the art.

The description given herein is by way of example with primary respect to a video monitor. As previously mentioned, video refers to the groups of elements irrespective of their use or form of existence or creation and will be understood to mean such even though described with primary respect to television elements.

Figure 2:
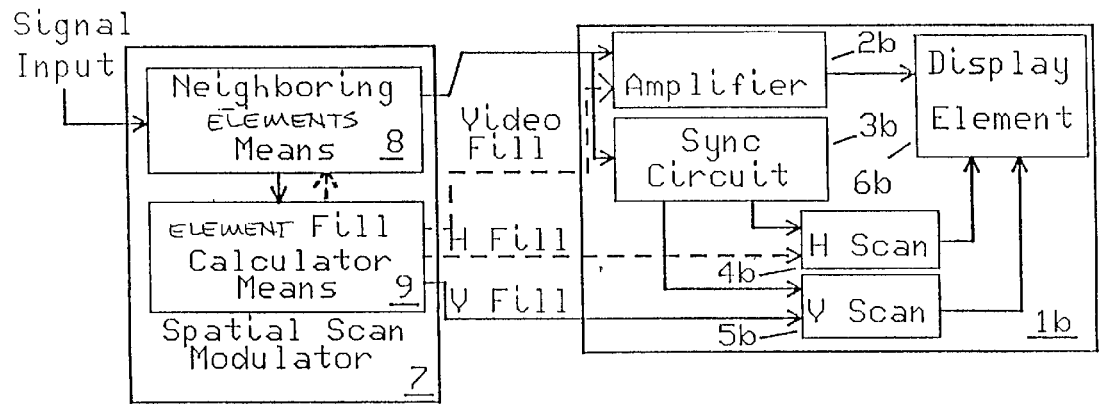
FIG. 2 is a block diagram of the device of FIG. 1 including the present invention.

FIG. 2 is a block diagram of a display device 1b like 1a of FIG. 1, including amp 2b corresponding to 2a, sync circuit 3b corresponding to 3a, H scan circuit 4b corresponding to 4a, V scan circuit 5b corresponding to 5a and display element 6b corresponding to 6a. FIG. 2 also shows the spatial scan modulator 7 as an embodiment of the present invention containing neighboring element means 8 responsive to the signal to provide a plurality of neighboring elements to the element replication means 9. Neighboring element means 8 may also be responsive to element replication means 9, as will be discussed with respect to FIGS. 10 and 11. The neighboring element means 8 also provides a delayed version of the signal of the amp 2b and sync circuit 3b in order to make up for processing delays as will become apparent to one skilled in the art from the discussion below.

Delay will be understood to encompass deriving different elements in time and/or space by a variety of well known means, including the specific example of delaying a time sequential series of image elements.

The element replication means 9 provides a V fill signal to the V scan circuit 5b in response to the plurality of neighboring elements from 8 in order to cause a vertical filling or dithering of the element scan or addressing at the proper times. The spatial scan modulator 7 therefore operates to determine where voids or elements to be replicated exist between elements or are created between or on elements by defective elements, and how these voids (as previously defined) are to be filled in the image. This determination made by an inspection of a plurality of neighboring elements, and then causing the creation and/or display device to replicate, fill, replace, or otherwise modify the appropriate location in response to the fill signal. Shown as optional is an H fill signal provided by 9 and coupled to 4b to cause horizontal filling, and a further optional video fill provided by 9 and coupled to 2b to cause modulation or filling. The device can also be utilized to replicate non-defective image elements with no ascertainable artifacts (again the term void covers all situations).

As with the various display and creation devices known in the art, the fill signals (as previously defined) provided by 9 will take on different connections to the devices 2b, 4b and 5b, resulting from the differences in those devices.

It is the object of the fill signals from 9 to cause the appropriate filling of locations in the image by whatever means is suitable for the particular imaging device being used, whether during creation, recording, and/or presentation of the image. These locations which may be voids in the image which may be filled with all or a portion of a element, or all portions of combinations of elements, or otherwise as will be described in greater detail later, especially with respect to the specific video display embodiment FIGS. 10 and 12.

In the present example, the voids or element locations are filled by slightly dithering the example electron, light beam or other imaging device away from its normal scan position by manipulation of the sweep circuits of the scan circuitry during creation and/or presentation of the image element.

For a light beam type device the voids may be filled by dithering, modulating or focusing the beam. For addressing type devices the dithering may be accomplished by manipulating addressing and filling as may be accomplished by such dithering. In all devices, filling may be caused by modification of existing elements.

For the device described by way of example, the V fill signal will cause the electron, light beam, imaging or creation device to be modulated vertically, either upward, downward or sideways or both to cause given scan line to become wider in an upward, downward, sideways and/or all directions. In a video circuit this can be simply accomplished by adding or subtracting a small amount of high frequency pulsating current in the sweep or scanning driver circuit in a video circuit, thus broadening the electron or laser beam slightly upward or downward from its normal position on the face of the CRT or photo sensitive surface. Similarly, the H fill signal can cause a slight horizontal displacement of the beam position by adding or subtracting a small amount of high frequency current from the H sweep or scanning driver circuit. In order to accomplish diagonal or angular displacement of the electron beam, a modulation of both H and V deflection circuits may be made. Such modulation of the electron beam position is relatively easy to accomplish in terms of circuitry requiring only a bidirectional current source, or a pair of unidirectional current sources, which are switched on and off at high frequency rate in response to the fill signals, and add or subtract current in the sweep or scanning circuit, thereby slightly modulating the current flowing in the driver and thus altering the electron beam deflection. The operation thus causes a dither of the beam modulation, which will be explained in greater detail with respect to FIG. 5.

In alternate creation/presentation circuits the signals to/from various circuits would be appropriately modified.

The beam modulation of any image conveying beam such as electron or light can also be achieved by changing the deflection, intensity, shape, duration, focus or astigmatism of the beam, and/or scanning, thereby changing the spot size and/or shape. The modulation of the conveying beam may be caused to take place in various directions as well, for example in diagonal directions, in response to the pixel replication means 9. Such improvements will be understood and may be made by one skilled in the art in view of the present teachings.

The art of changing electron beam deflection by small amounts has been previously practiced, for the purpose of geometric scan correction. In general the exact method of effecting the modulation of the display will be determined by the nature of the display printing, or imaging device; however, one skilled in the art will be able to devise proper circuitry to practice the present invention for a given desired type of creation and/or display device, in view of the teachings herein.

The fill signal may be utilized to generate the desired elements (which may be including additional elements replication) on the input signal in response to 9, with or without scan modulation, thus providing elements to fill in the desired blank areas of the image (which may be blank as in voids, unneeded, unwanted, or otherwise).

Filling may be accomplished by simply adding the fill signal to the signal in a monitor device so that the electron beam is caused to illuminate the CRT phosphor in response to the fill signal as well as the signal.

Illumination may be caused to occur in the absence of a signal generated illumination, or may cause the signal generated illumination to be modified, such as by being increased or decreased. The image fill signal may also be utilized to perform other image functions as will become apparent, such as reducing the bandwidth of the signal, or by changing the element or spot size for example by de-focusing the electron beam, repeating a displayed element, or generating a new element (especially in non-direct scanning devices).

New elements used for filling of voids including the substitution or replication of existing elements may be comprised of all or a portion of a element or group of elements.

Figure 3:
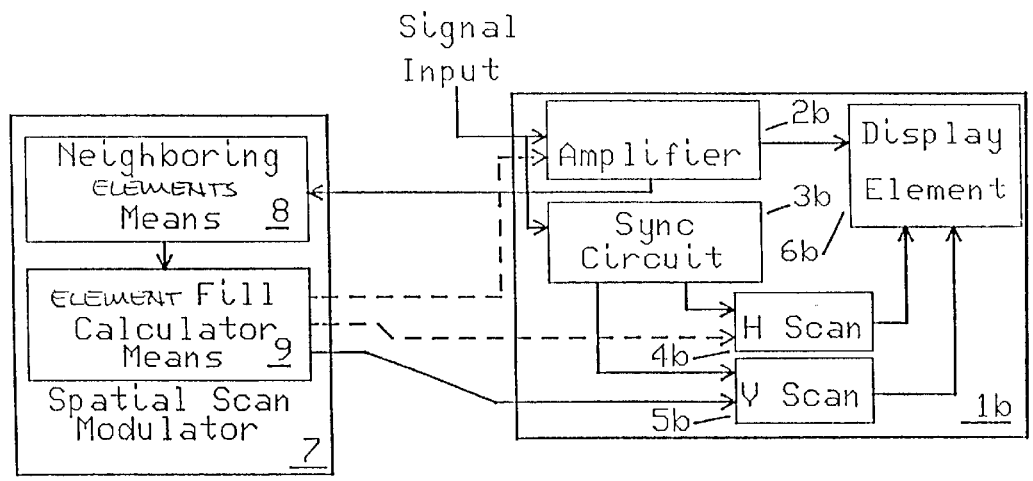
FIG. 3 shows a modification of the drawings of FIG. 2 wherein the spatial scan modulator is

FIG. 3 shows the same elements as in FIG. 2, however the neighboring element means 8 is coupled to amp 2b to receive the input signal, rather than directly to the input, as in FIG. 2. Several other embodiments relating to coupling and arrangement of elements will be possible, as will be apparent to one skilled in the art, and are intended to be considered within the scope of the invention as herein described and claimed.

FIG. 4a shows a typical scanned image 10a (whether creation and/or reproduction) with a small portion 11a which is expanded for clarity in 4b. The small portion 11a shows four scan lines 12a, 13a, and 15a. The scan lines may be considered consecutive for the purpose of the present explanation, but may also be alternate as in an interlaced display, or otherwise non-consecutive. The scan lines are shown thicker during the higher illuminated portion, the thickness representing the width or intensity of the scanning beam, with the narrow line representing the scan track normally followed by the beam, as is common for laser beam projection and recording devices and CRTs. Also this scan line is representative of what exists in alternate imaging devices.

With more modern creation and/or presentation devices the modification is more theoretical-occurring in electronic form during and/or after creation instead of during presentation.

Scan line 12a has seven illuminated element points 16a through 16g identified for clarity. As with many systems, the individual elements typically blend together when sequentially aligned along a scan line, due to both the width of the beam, and the limited bandwidth of the video amplifiers in the device, giving rise to the continuous highlighted areas shown. It will be understood that the individual elements may also represent a matrix display rather than a scanned display. The four scan lines show a diagonal bright area which can be seen to take on a rather stair stepped appearance. The stair stepping and the space between the scanning lines make up picture artifacts that viewers find objectionable in viewing the image, whether created during creation and/or presentation.

It is one object of the present invention to fill in the voids of the stair stepping and voids between consecutive scanning lines, for example by modulating the scanning of the electron beam in a video device, thus reducing these objectionable artifacts.

FIG. 5a shows the same display 10b as 10a in FIG. 4a, with expanded portion 11b corresponding to 11a, and showing scan lines 12b, 13b, 14b, and 15b corresponding to 12a, 13a, 14a, and 15a respectively. Again the creation/alteration presentation circuits would be appropriately modified.

Illuminated elements 17a–g corresponding to 16a–g are shown as well as illuminated pixels 18a–e. For each element which is to be partially modulated during creation or during production, an up or down arrow is shown indicating the direction(s) of modulation. For example, element 17b is modulated downward to fill the void between 17b and 18a. Likewise elements 17c–g are all modulated downward. Elements 18a and 18b are modulated upward to fill the same void and 18c–e are modulate both upward and downward. One skilled in the art will recognize that the image of FIG. 5 has a higher apparent resolution than that of FIG. 4, the improvement being a result of the filling of voids (even if previously occupied by valid elements). This modulation can occur in the original image scanning circuitry, modifying the element signal during or after storage, or otherwise. The same type of image modification would also occur in alternate imaging devices such as scanners, laser printers or fax machines.

With respect to FIG. 2, when element 18a is being scanned, the neighboring element means 8 would provide the elements adjacent to 18a, including 17b, 17c 17d, and 18b, for inspection by element replication means 9. The element replication means 9 will determine that there is a void between 17c and 18a which should be filled, thus causing 18a to be modulated upward into the void. The void may be actual or artificial (as when the device ignores valid elements).

Figure 5:
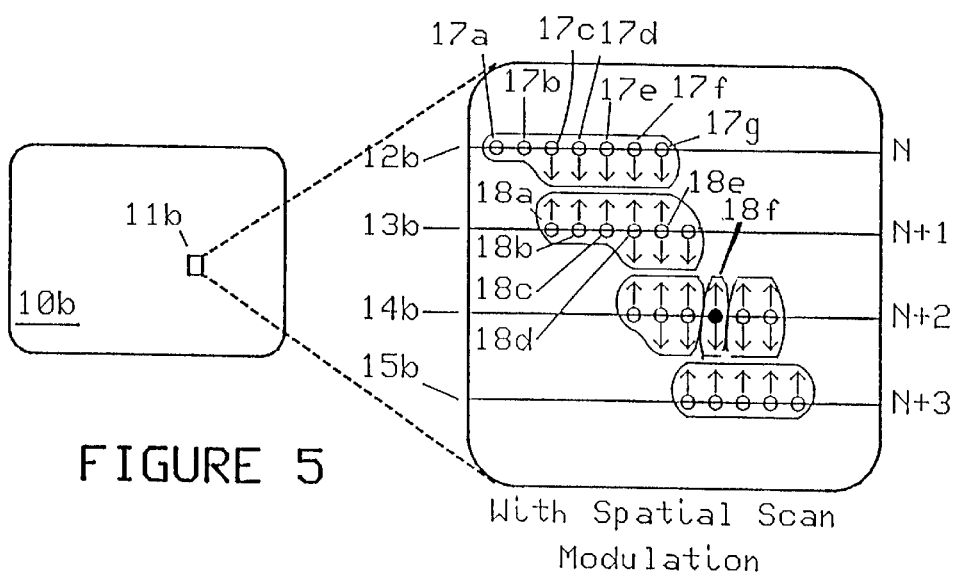
FIG. 5 shows a typical scanned image display as would occur with the use of the present invention, with a portion expanded for clarity.

It can be seen from inspection of FIG. 5 that a good portion of the voids between scanning lines or matrix elements, as well as a portion of the stair stepped edge void have been filled in. Element 18f is shown as being a defective element which has been replaced thus causing filling of the void which otherwise would have been present to be filled.

It may be noted that an object of the present invention is to provide a method of filling voids without restriction to the nature of how such voids arise, although it will be appreciated that the nature of such filling may very will be optimized in response to the nature of the void and that the voids might discard valid image elements at the involved location. For example the filling of voids between elements may be performed differently than the filling of voids created by defective elements. As another example, assuming 18f were defective due to a defective video element, the element may be replaced to cure the defect. If, on the other hand, the element for 18f were not defective by itself, the artifacts produced by a defective florescent element, the location could be filled by lighting, or increasing the lighting of the neighboring elements. Further, the invention may be utilized to replicate valid, non-defective image elements due to the probability of similarity. This allows continual processing of a signal through a circuit without on/off switching while producing minimal artifacts.

Figure 6:
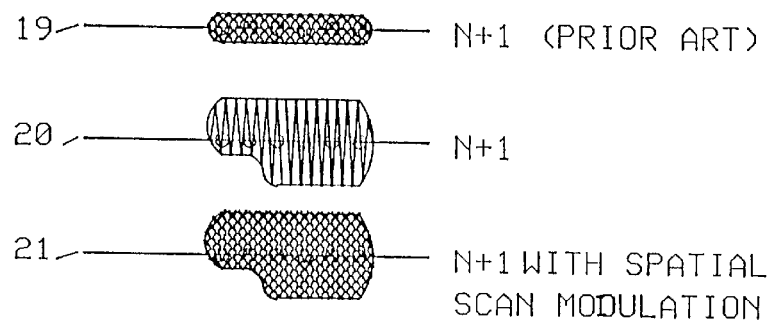
FIG. 6 shows a detailed diagram of a given scan line of an image in prior art form and in improved form resulting from the present invention.

FIG. 6 shows a typical prior art scan line 19, corresponding to 13a of FIG. 4b, having an illuminated section of 6 elements shown as a wider portion of the line. The elements may be created in any known way such as by scanning light or electron beams, LED's, LCD's or laser beams, by spatial addressing an imaging device or by signal alteration.

Figure 4:
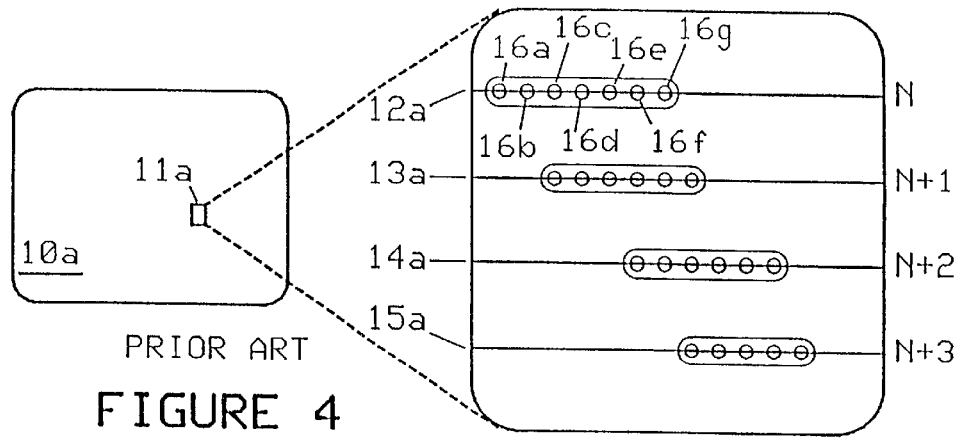
FIG. 4 shows a typical prior art scanned image display with a portion expanded for clarity.

As with the previous example of FIGS. 4 and 5, the individual elements have blended together gaining a continuous illuminated section. The presented scan line 20 shows the same line as 19, except that it has been spatially modulated in accord with the present invention thus corresponding to 13b of FIG. 5b. The track of the beam is shown in 20 as a sinusoidal path, or spatial modulation, which deviates from the straight scanning line of the prior art. This same result could be provided by alternate means.

Note that for the left two elements the deviation takes place both above and below the line. In the preferred embodiment of the invention the electron beam or memory laser path is such that the track pitch, the spacing between the points where the track crosses the normal scan line, is less than the electron or reproduction beam width. Therefore the electron or beam width will illuminate a solid area. The illuminated area created by the beam path shown in 20 is shown as a solid are in 21. It will be noted that the ability to fill in chosen directions only, such as only up to 21, is an important feature.

A note should be made about the relative brightness of the spatially modulated scan of 21 versus the area of the prior art scan 19. The brightness of a given area is a function of the flux density of the electron, light beam or image signal striking that area, that is a given number of electrons or photons or other image creating energy will tend to provide a given number of photons of visible light or particles of dye or pigment, independent of the area which it strikes. For a given electron or beam intensity, the area of 21 will therefore appear dimmer in terms of visible photons or particles per unit area than the area of 19. If a given spatial scan modulated area of the image is large enough to be resolved as a distinct element, the viewer may notice this decreased intensity. In order to overcome this decreased brightness, it will be desirable to increase the intensity of the image creating beam, therefore restoring proper brightness in those areas where the spatial modulation is occurring. The brightness increase will typically be a function of the amount of modulation. For example while the beam is modulated only upward for the left two elements of 20, a first given increase should be made, and for the remaining elements where the beam is modulated both up and down with a second, higher, increase made. This increase in beam intensity can be made in response to element replication means 9 shown in FIG. 2, via the fill signal. It may also be desirable to utilize the fill signal to increase the number of illuminated elements, in conjunction with the spatial scan modulation. For example, the illuminated area of line 20 (13b of FIG. 5) can be tuned on one element early in order to further reduce the stair stepping of the diagonal edge. This may be accomplished by time or spatial modulation of the image creating beam.

Alternate imaging devices would similarly operate, albeit with adaptations for their special properties. For exampled, with a LED or LCD imaging device (such as a printer), modifications of the brightness of successive lines of image information and/or the modulation of the image elements in what would otherwise be spaces between lines would be one way to produce the image improvement of the present invention.

FIG. 7 shows a group of 9 elements which are located on 3 scan lines of a raster or alternatively in 9 matrix locations. These nine elements are provided by the neighboring element means and may be utilized by a element replication circuit in order to determine if spatial scan modulation or other filling should be enabled. In the following discussion it will be assumed that element X (the central element) is defective or wanted to be replaced, as is known from error detecting circuitry or as determined by the element replication 26, or is otherwise to be replicated. It will be assumed for the purpose of the present example that element X in the center of the 9 elements, is the element about to be displayed or created by the display element. Scanning will be assumed to be from left to right, top to bottom. However it will be understood that the present explanation will apply equally well to any image creating and/or displaying device or system independent of the manner in which the image elements are scanned or placed as well as to any point of the image for example element A in FIG. 7 could be processed.

For the described scan, elements A–D will have occurred in time before X, and elements E–H occur in time after X. The 9 elements are all made simultaneously available to the elements replication by the neighboring elements means (8 of FIG. 2). The neighboring elements means in the preferred embodiment is made up of memories, delay lines, shift registers or other delay devices which are well known to one skilled in the art, which allow all nine of the elements to be present simultaneously. A different number of elements could also be present.

Figure 10:
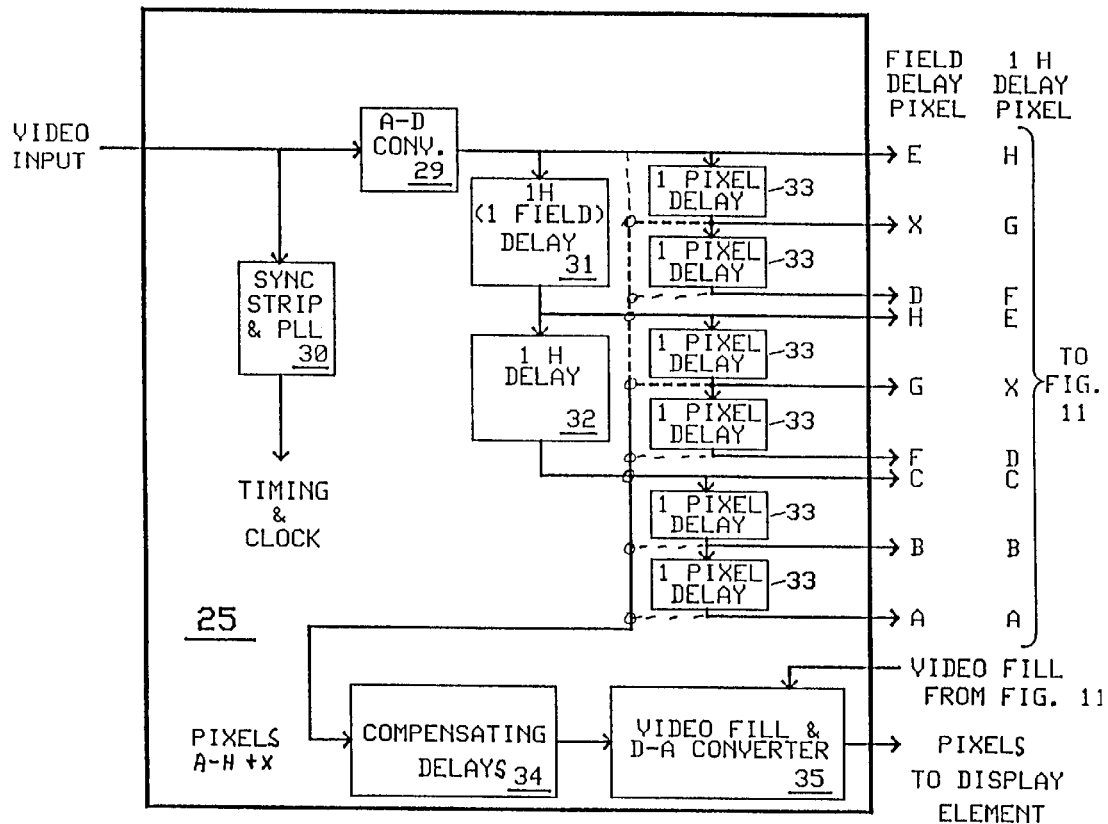
FIG. 10 shows a detailed diagram of an embodiment of a neighboring means for a image display.

A device which can be utilized for the neighboring elements means function is described, with respect to FIGS. 9 and 10, in U.S. Pat. No. 4,573,070 issued Feb. 25, 1986. Other arrangements and circuits to perform this function will be apparent to one skilled in the art from the present disclosure, for example, retrieving elements from RAM as in matrix displays. In order that elements X can be the about to be currently displayed elements, it is necessary that neighboring elements means make elements available to the display device, which is shown by the connection from 8 to 2b and 3b of FIG. 2, which replaces the video input to the display device.

FIG. 7 shows eight possible replication direction differences which can determine the direction of replication for an element X. This element X could be defective, non-existent merely unnecessary, or disposable (even if valid) —the latter most particularly in respect to an unswitched, constantly operating device. The major factor is the desire to have element, replication, or substitution. The eight differences are represented by eight lines P–W. Line P represents the difference of elements A and H, Q of elements B and G, T of elements B and E, etc.

Element X may well be replicated from any direction, including those of the third dimension, which would represent a frame to frame or time direction, or a combination of time and spatial dimensions. Replication in the time dimension is useful in improving motions artifacts. Time replication is accomplished by using delays of one picture period (field or frame in a monitor device) or more to provide elements in the time axis, which may be used to fill temporal voids. It is particularly useful in a video imaging device.

Element X will thus modulated in response to elements which are present in field or frames other than the one containing X. U.S. Pat. No. 4,573,070 which is incorporated herein by reference describes more fully various embodiments of neighboring elements means which may be suitable for use in this fashion, and particular FIGS. 13, 15 and 16 and the description thereof teach detection of a defective element X. Alternatively, the detection of a defective element X may be performed by various defect or error checking circuitry as is well known in the art.

It will be immediately recognized that by comparing elements on the opposite sides of X, it is possible to determine which pair of surrounding or neighboring elements which are most similar. The most similar pair thus represents the pair of image elements most likely to provide the least noticeable replication value for an element X, and also indicate the direction(s) of modulation of X to fill voids adjacent thereto. For example if A–B=9, B–G=7, C–F=8, and D–E=3, the preferred pair of elements for replicating X would be pairs D and E and either could be chosen for replication. Alternatively, a normalized combination of the two pairs such as an average can be used.

This logic holds true if in fact X is related to elements on two opposite sides. However X may be related only to the elements in the corners, that is to elements A, B, and D (upper left), B, C, and E (upper right), E, H, and G (lower right), or G, H, and D (lower left). The logic conditions shown below thus preferably takes all eight conditions into account, selecting the lowest difference pair of opposite or corner elements to determine the direction(s) of modulation of X, to fill voids adjacent to X, or giving the direction or pair of elements most likely to provide the least noticeable replication value for an element X in FIG. 7.

For the purpose of the present description and the purpose of explanation, it will be assumed that only the two dimensions, and the replication directions indicated by the 7 differences are to be considered.

A group of similar elements is easily implemented by logic operations as may be utilized to determine which if any of the 8 spatial replication directions should be enabled for a given elements X. Logic operations that may be used to enable the modulations according to the following table include:

| MODULATION DIRECTION | CONDITION |
| --- | --- |
| VERT. | B-G < A-H or C-F or D-E or B-E or E-G or G-D or D-B |
| HORIZ. | D-E < B-G or A-H or C-F or B-E or E-G or G-D or D-B |
| R.DIAG. | C-F < B-G or A-H or D-F or B-E or E-G or G-D or D-B |
| L.DIAG. | A-H < B-G or C-F or D-E or B-E or E-G or G-D or D-B |
| U.LEFT | D-B < B-E or E-G or G-D or B-G or A-H or C-F or D-E |
| U.RIGHT | B-F < E-G or G-D or D-B or B-G or A-H or C-F or D-E |
| L.LEFT | E-G < G-D or D-B or B-E or B-G or A-H or C-F or D-E |
| L.RIGHT | G-D < D-B or B-E or E-G or B-G or A-H or C-F or D-E |

FIG. 8 shows by way of example an embodiment of the present invention which may be utilized with image elements. The FIG. 8 embodiment contains a neighboring element means 25 similar to 8 of FIG. 2, and an element replication means 26 similar to 9 of FIG. 2.

The element replication 26 contains a rank logic means 28 which cooperates to inspect the 9 neighboring elements A–H and X presented on lines 30A–H and X respectively, and provides a fill signal on line 32 and replaces signals on line 36 respectively, which device operates to control the spatial modulation of element X. It should be noted that in FIGS. 8 and 12 the fill and replace lines are shown as single lines for clarity, and further that the connection which provides element X to the display device as well as the video fill connection to the display amp are not shown for clarity. One skilled in the art will however recognize the need for, and be able to provide the proper coupling of, element X and element fill and replace functions to the image device via multiple connections and couplings with the element replication as appropriate for a given application.

As will be apparent from the present teachings, many of the functions of the present invention can be implemented with various forms of hardware including ASICS, programmable logic and analog or optical circuitry and software running on any of the various well known platforms. For example, microprocessors with suitable software may be utilized. As a further example, a read only memory may be utilized. In particular, a ROM or programmable logic would be well suited to implement part or all of the elements replication means 26.

The determination of which neighboring elements are related to element X is a ranking process, which is described in one form in some detail in the aforementioned U.S. Pat. No. 4,573,070 with respect to video noise reduction. The '070 patent does describe and claim the replication of defective elements, for example at column 4 line 49 et. seq. and column 8 line 45 et. seq. The ranking circuitry shown in FIGS. 15 and 16 of the '070 patent can be utilized for the rank logic means of 27 of FIG. 8 of the present invention, but the rank logic means of the present disclosure has been found to provide superior performance when utilized for applications to replace defective or unneeded elements. The rank logic means 27 operates in response to the elements A–H and if needed X provided via 30A–H and 30X to determine each of elements A–H relative closeness to all the others. For example if elements C–F were determined to be closest to each other, then signifying a rank of 0 (that no other element pairs are closer) would be output on line 31R. If 2 other elements were closer than elements C and F, a 2 would be output on line 31R. Each element pair will be ranked by 27, with that pair's respective rank provided on line 31 P–W. The fill logic means operates to select a given number, for example 2 or 4 of those elements which are closest and identifies them. The logic equations given above for the example of FIG. 7 are then used to determine the modulation and/or replication directions to be enabled. This ranking may occur by comparing all groups for similarity (parallel processing) or by comparing each group to the next group sequentially retaining the most similar (serial processing). This latter is more efficient.

Further the rank logic means may also operate to rank elements in respect to their dissimilarity, thus not utilizing elements that do not meet a minimum criteria for similarity ranking. This recognizes that elements that are known to be largely dissimilar do not have to be ranked for similarity. This provides considerable saving (of most particularly processing time) and circuit complexity since the complexity of calculations increases exponentially as to the number of elements utilized. Preferably therefore the ranking of elements would be a multiple-step process: first discard dissimilar groups of elements not sufficiently similar in respect to each other and/or other sets so as to not warrant subsequent processing providing at least one set remains and then second ranking of the groups of similar elements. A threshold to establish similarity is particularly effective in the initial step.

Note that more than two elements may be compared in a group, for example groups of 3 or more may be compared. For example, group ABD, BCE, EHG, and GFD may be compared to determine the total difference, for example A–B+A–D+B–D as the difference for ABD.

As an example, assume that the element pairs have the following ranks:

| | |
|---|---|
| P = 0 | Q = 1 |
| R = 7 | S = 2 |
| T = 6 | U = 5 |
| V = 4 | W = 3 |

From the above chart it can be seen that pairs P, Q, and S are closest thus indicating element X is most likely related to a diagonal from element A to H. The three closest elements will be identified as A and H, and of the above logic equations the following will be satisfied:

VERT
HORIZ
L. DIAG

These equations being satisfied, the modulate VERT signal, and modulate HORIZ signal, and modulate LEFT DIAGONAL signal will be activated. As a result of the above analysis, the void between elements A, B, D, and X and E, G, H, and X would be caused to be replicated by spatial modulation of elements X if X were not defective. Alternatively, the voids and/or element X could be replicated by elements A, B, D, and E, G, and H, or combinations thereof respectively. As an improvement to the spatial modulation, the amplitude or spatial intensity of the modulation may be changed in response to the ranking of the neighboring elements. For example, if the difference between X and A is small, a large amplitude of modulation is used; and if the difference were large, a small modulation used. The amount of modulation is therefore caused to vary in response to the difference, in either spatial or temporal embodiments. Of course, intensity or other attribute modulation may also be provided as well, as previously discussed. Additionally, if element X is defective or unneeded, it may be deleted, thus creating a void, and the void may be replicated with a combination of those element pairs having the closest values, in the above example, pair A–H or Pairs A–H and B–G. For a continually operating device, element X could be replicated even if not defective.

It is important to note that by ranking the various element pair differences P–W that a very accurate prediction of the value of X may be made in the event X is defective. By inspecting the differences and their ranking, the individual surrounding elements, in space and time, which are most closely associated with X may be determined with a high probability. A combination of a plurality of those most closely associated elements may then be utilized to replace element X, to fill any voids near a good or defective X, or even to totally replace a valid element X (which would treat X as a void irrespective of its true nature).

Such combinations which have proven suitable for use include any of the various averages which are well known, including arithmetic and geometric averages, means, medians, weighted combinations, spatial and temporally filtered combinations and various interpolations and curve fittings. It has also been found that selecting a single element from the group of most closely associated elements to use for fill or replication works quite well. In particular, choosing a median value element of the most similar group has been shown to offer quite good performance. In particular, choosing the two most closely associated groups of elements, and choosing one of the two median elements of the groups, the one closest to the average of the four, has been found to give quite good performance.

In summary then, the preferred operation begins by selecting a location for image enhancement. This location may be anywhere in the image including along the edges and corners thereof. Once the location is ascertained, the plurality of groups of two or more elements having a relationship to the location are ascertained. These groups may be adjoining, neighboring, having a theoretical similarity, and may be present with a time or space variable or combination thereof. After the groups are ascertained, each image element in the group is compared to the other elements in the same group to determine the similarity or how closely the individual elements within each group match. Note that this is possible for a single element to be in more than one group. This similarity is preferably typically determined by the absolute value of A minus B or similar function (to increase operating speed and reduce circuit/software complexity). This comparison could include a preliminary dissimilarity threshold which would in operation not process elements which are significantly dissimilar to other sets or to a predetermined theoretical or percentage value of difference. This dissimilarity threshold could be by ranking of the groups of elements or by comparison of the differences between image elements in each group.

Once the similarity within each group has been ascertained, the similarity of each group is compared to the similarity of all the other groups to ascertain which groups have the most closely matching image elements or most similar image elements. This can be accomplished by sequentially comparing the similarity of each group to a subsequent group, discarding the most dissimilar before repeating the process, by ranking the groups outright according to their similarity, or otherwise.

Once the most similar group, or groups, have been ascertained, then one or more elements within the most similar group are used to generate a replication, value for use at the particular location. The image element(s) chosen can be one of the most similar pair, an average of the most similar pair, an average of the image elements in a group of closely related image elements, an average of the most similar of the image elements within groups of associated image elements, an average of all of the image elements within the associated groups or otherwise. Further, the image elements can be replacing an otherwise valid image element, replacing a defective image element, or filling in empty spaces in time or space around the location. All this is separate of the need to determine whether or not whatever may exist at the particular location is defective, or missing since replication provides very good estimate of the noise free value of a given image element at a particular location.

FIG. 9 shows an element configuration which results from one embodiment of the present invention. From the above description it can be seen that it will be relatively easy to configure the invention to operate in time to generate new lines, rows or new fields or frames of video. Such a configuration may be envisioned by assuming that elements A, B, and C are from a first field (or row or line); D, X, and E from a third, generated field (or row or line); and elements F, G, and H from a fifth field (or scan line). Intermediate fields or rows or lines with elements I J K and L M N can also be utilized. Such a system is shown in FIG. 9 where elements A–C, I–K, L–M are taken from the incoming video signal and elements D, E, and X are fill or synthesized elements which are generated in response to the operation of the elements which are generated in response to the operation of the elements replication.

The new element X would be the value calculated for element X as described above, which is stored in a field or other memory matrix and displayed in the prior time or space sequence by the display element. Alternately, the new elements could be a calculated value derived from a plurality of the elements, as will be discussed with respect to FIG. 12.

FIG. 10 shows the preferred embodiment of the neighboring element means 25 of FIG. 8 in greater detail in a video application. Input video is coupled to an A-D converter 29 where it is digitized and output as a digital video data stream. The input video is also coupled to a sync stripper and PLL circuit 30, which provides all of the required clock and timing signals for the elements of 25 and also the circuit of FIG. 11. The connection of the various clock and timing signals are not shown here for clarity. The A-D converter 29, and sync stripper and PLL 30 are will know in the art, and are commonly found in such devices as time base correctors and other video processing devices. One skilled in the art will be able to utilize any of a number of well known circuits and I.C.s to implement 29 and 30. For example, the AD9502 Hybrid Video Digitizer, provided by Analog Devices of Norwood, Mass., Provides all of the PLL and digitizing functions of 29 and 30. The digitized video is output at a fixed number of samples per line depending on the particular version of the AD9502. Digital Delays 31, 32 and 33 are coupled to the digital video output from 29 in order to provide a plurality, in this example 9, of delayed versions of the digital video signal. 1 H delay I.C.s, suitable for 31 and 32, are available, such as the N.E.C. UPD41101, and 1 field delay I.C.s suitable for 31, are also available, such as the N.E.C. UPD41221. Application notes on the use of these I.C.s are available form N.E.C. Electronics Inc. in Mountain View, Calif. A 1 element delay I.C. suitable for 33 is the 74HCT374 Octal Latch, available from multiple sources. At any instant, nine different elements will then be present at the output.

Referring to FIG. 10, one skilled in the art will note that if delays 31 and 32 are 1 scan line (1H) and delays 33 are 1 elements each, then the elements labeled A–H and X in FIG. 7 will be present at the right side output of 25. In this example, the display of FIG. 7 is assumed to be either a progressive display, or an interlaced display without the second field shown.

Assuming, for another example, that FIG. 7 shows scan lines 22 and 24 from an earlier field of interlaced scanning, and line 23 is from a present field of scanning, one skilled in the are will recognize that if delay 31 is one field, the output from 25 will correspond to the elements depicted by FIG. 7.

One skilled in the art will realize that the one field delay 31 will be required to make available at H, the previous field scanning line above the present field scanning line available at E. It should be noted that in many interlaced systems, the actual length of the delay will vary by one line from field to field, depending on whether the even or odd field is being delayed. In the use of the N.E.C. UPD41221 I.C., the proper alignment of input and delayed video is simply accomplished by use of the increment (INC) and decrement (DEC) controls. One skilled in the art will however, be able to construct such a delay, as is well known in the art. When used with matrix or other types of non time scanned video, RAM memories may be substituted as will be known from these teachings.

Of course the invention may be utilized with digital data, such as in D1 or D2 digital video or with fax, modem or laser printer data as will be apparent to one of ordinary skill in the art from the teachings herein. The invention is particularly useful with compressed data, and provides considerable image enhancement and reduction of both random noise and defective elements noise for such digital images, especially for JPEG and MPEG compression systems.

In order to make elements X available in analog form for use by a display element, as shown in FIG. 2, digital elements X is displayed by a compensating delay 34, and then coupled to a digital to analog converter and video fill circuit 35, where it is converted to an analog signal. The N.E.C. UPD41101, or a combination of 74LS374 I.C. s, can be used for 34. The Analog Device s HDG-0805 Hybrid Video D-A is a suitable part for the D–A function of 35. In addition, the HDG-0805 has a 10% bright control which increases the video signal level by 10%. This 10% bright control may be coupled to the video fill signal from the elements replication. Alternatively, a separate video gain circuit may be utilized to control the video fill signal. Such gain circuits are will known in the art. In the preferred embodiment, the analog elements X may be coupled directly to the CRT. The D–A converter also maybe caused to vary the intensity of analog elements X in response to a video fill signal coupled from the fill logic circuit 28 of FIG. 11. The purpose of the compensating delay 34 is to ensure that element X is delayed by the proper time with respect to the element replication generation of fill signals. The compensating delay may also be used in a temporal embodiment of the present invention to provide element X at the proper time (i.e. to place element X in the proper location in the displayed element sequence) for display in response to the element replication means. One skill in the art will recognize that it will be possible to combine delay 34 with the delays 31–33 which provide the neighboring elements. For example, if 34 is to have a delay of 1 element, then element D can be coupled directly to 35, eliminating 34.

Figure 11:
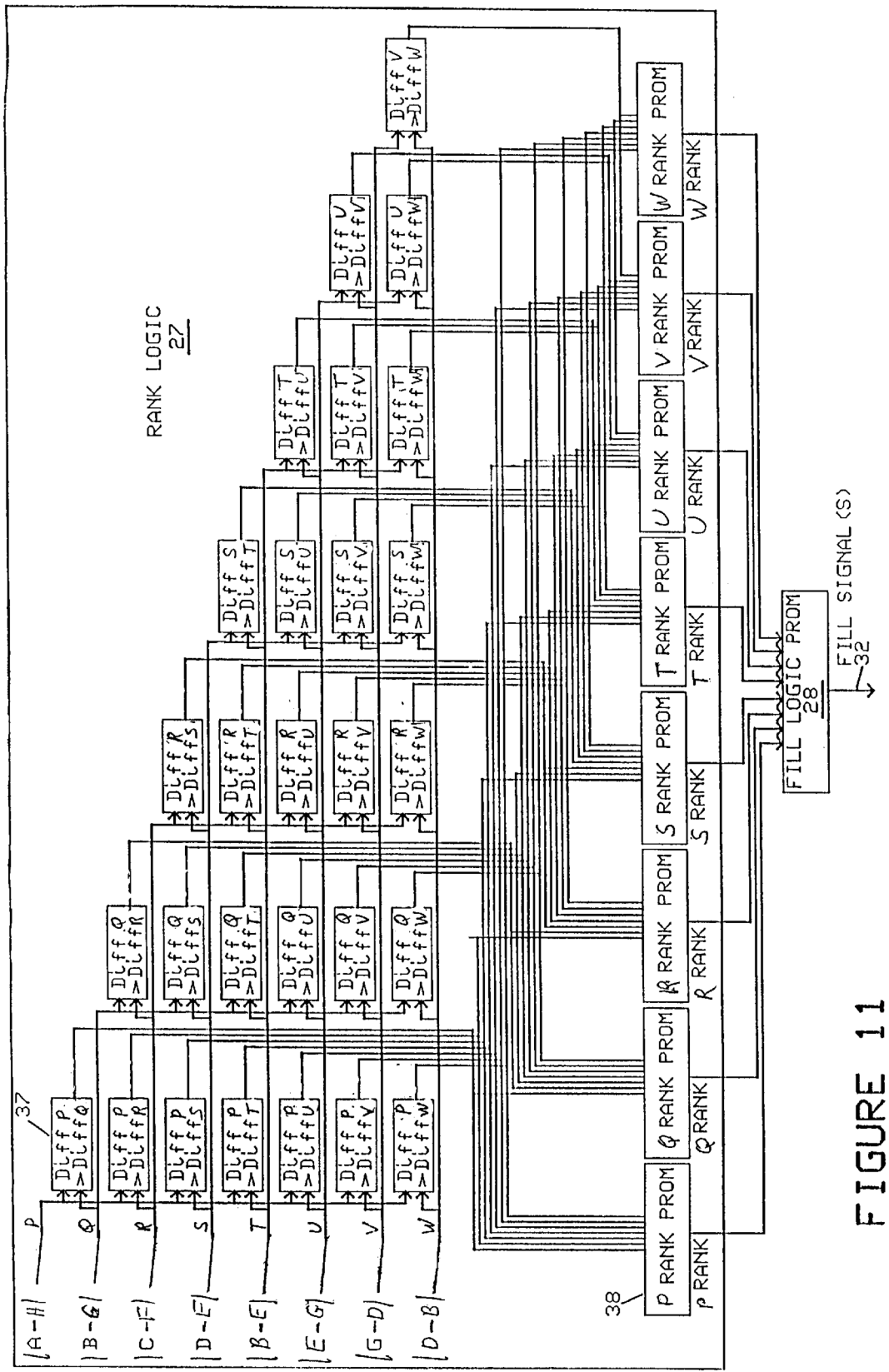
FIG. 11 shows a detailed diagram of an embodiment of a element calculator means.

FIG. 11 shows the preferred embodiment of 26, the element replication means, of FIG. 8. The rank logic means 27 of FIG. 11 receives element A–H and computes pair differences P–W from the neighboring element means 25 of FIG. 10. Each element A–H is compared to its corresponding partner to determine the relative difference by a difference determining circuit. Each difference is then compared to all of the other differences by a difference comparison circuits 37. For the 8 elements A–H there are then 8 difference determining circuits and 28 difference comparison circuits 37. Any pair(s) that has a dissimilarity to the other pairs are preferably disregarded in subsequent processing. The 7 outputs of the difference comparison circuits which are responsive to a given elements pair(s) difference comparisons are coupled to an individual ranking circuit 38, which in the preferred embodiment is chosen to be a PROM. The PROM outputs a binary number which corresponds to the number of other differences a given difference is larger than. For example, if the difference is larger than 3 other differences, the output of the P rank P PROM would be 3.

The rank values from each ranking PROM are coupled to the fill logic circuit 28, which in the preferred embodiment is made up of PROM I.C.s. The fill or replication logic circuit 29 generates the previously discussed replication signals and/or chooses appropriate matching elements in response to the 8 rank values. The replication signals are then coupled to replication circuit of 35 in FIG. 10, as well as the display element, as previously described.

Figure 12:
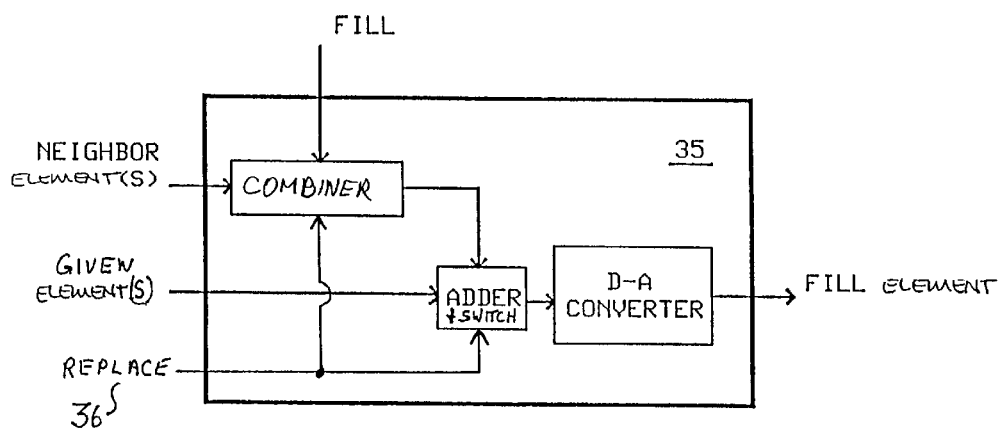
FIG. 12 shows an alternate embodiment of a fill and D-A converter.

FIG. 12 shows as an alternate embodiment of the video fill and D–A converter 35 of FIG. 10 in applications depicted by FIG. 9. The function of the preferred embodiment of FIG. 12 is to generate a fill element which is similar or equivalent to element X. This embodiment of FIG. 12 generates a fill element, for use as element X of FIG. 7 or 9, in response to the video fill or replication signal from FIG. 11. The fill element may be a combination of a plurality of elements. The fill elements may be caused to be only a single elements, or a combination of elements in response to the video fill signal. The embodiment of FIG. 12 operates to generate a combination of elements in response to the video fill signal, and combine that combination with voids around element X in the adder. The combination is then converted to analog by the D–A converter. Alternatively, a replication from element X may also be generated by the combiner, in response to the video fill signal. The replace signal 36 causes the adder and switch to replace X with the combination from the combiner. The normalization of the replication combination may also be adjusted. Various types of combinations and weighted averages can be utilized for this combination, including the use of more than two elements in the combination to generate the fill elements(s).

While the above preferred embodiment of the invention has been described by way of example, many other embodiments may be utilized to operate in a given video system. For example the invention may be utilized with interlace scanning systems, or with multiple channel displays such as RGB color displays. A matrix of less or more than the suggested 9 elements may be utilized, which picture elements may be adjacent or non-adjacent, and may be symmetrically or non-symmetrically chosen. To one skilled in the art it will be apparent from the present teachings that there are numerous variations, configurations and embodiments of the above described invention which variations may be tailored into a specific embodiment to maximize effectiveness with a particular display device and video system without departing from the spirit and scope of the invention as hereinafter claimed.

What is claimed is:

1. Apparatus for improving the apparent resolution of an image displayed by a video display device, including in combination, a neighboring pixel means responsive to the signal which carries said image to provide a plurality of image elements, and a fill calculator means responsive to said plurality of image elements, which may be pixels, to generate a fill signal, said fill signal indicating where said display device may alter voids between image elements.

2. The apparatus of claim 1 wherein said image is improved by said neighboring pixel means which operates to generate fill pixels in said image in response to said fill calculator means.

3. The apparatus of claim 1 wherein said neighboring pixel means is responsive to said fill signal from said fill calculator means to generate fill pixels which are combined with said video signal to fill said voids.

4. An improved display apparatus for displaying an enhanced version of an image conveyed by a signal, said apparatus including in combination a neighboring element circuit responsive to said signal and operable to recover and temporarily store known ones of picture elements of said image so as to provide a group of neighboring elements including a central element, fill calculator circuit coupled to said neighboring circuit to determine if said neighboring elements, including said central element match known patterns of elements, video fill circuit coupled to at least said fill calculator circuit to modify the value of said central element in response thereto thereby providing enhancement of said image, and display means coupled to said video fill circuit and operative to display said enhanced image.

5. An apparatus as claimed in claim 4 wherein said signal is a digital video type signal conveying said image in raster form, said neighboring element circuit stores digital data bytes corresponding to said picture elements to provide a matrix of stored elements as said group with said central element being central to said matrix, and said fill calculator circuit determines if said neighboring elements match said known patterns of elements thereby indicating that modifying said central element is likely to enhance the perceived quality of said image when it is displayed.

6. An apparatus as claimed in claim 4 wherein said signal is a digital signal representing said image in raster like form, said neighboring element circuit stores digital data bytes corresponding to said picture elements to provide a matrix of M×N stored elements as said group with N being a number of lines of said raster and M being a number of elements in said lines and with said central element being central to said matrix, and said full calculator circuit utilizes digital logic operations to compare the pattern formed by said central element and the remaining said neighboring elements with a plurality of predetermined digital logic patterns to determine if there are any matches therebetween said matches indicating that modifying said central element is likely to enhance the perceived quality of said image.

7. An apparatus as claimed in claim 4 wherein said signal is a digital signal representing said image in raster type form,
said neighboring element circuit stores digital data bytes corresponding to said picture elements to provide a matrix of M×N stored elements as said group with M being a number of elements in a line and M being a number of lines of said raster and with said central element being central to said matrix,
said full calculator circuit utilizes digital logic operations to compare said neighboring elements with a plurality of predetermined digital logic patterns to determine if modifying said central element is likely to enhance the perceived quality of said image,
said video fill circuit operates whenever said modification is indicated to increase or decrease the brightness of said central element in response to said digital logic operations.

8. An apparatus as claimed in claim 4 wherein said signal is a digital signal representing said image in raster type form,
said neighboring element circuit stores digital data bytes corresponding to said picture elements to provide a matrix of M×N stored elements as said group with M being a number of elements in a line and M being a number of lines of said raster and with said central element being central to said matrix,
said fill calculator utilizes digital logic operations to compare said neighboring elements with a plurality of predetermined digital logic patterns to determine if modifying said central element is likely to enhance the perceived quality of said image,
said video fill circuit operates whenever said modification is indicated to modify the size and/or shape of the display of said central element in response to said digital logic operations.

9. An apparatus as claimed in claim 4 wherein said enhanced version appears to have increased resolution and detail resulting from the filling in of voids.

10. A method for displaying an enhanced version of an image conveyed by a signal,
said method including recovering and temporarily storing known ones of picture elements of said image so as to provide a group of neighboring elements including a central element,
determining if said neighboring elements, including said central element match known patterns of elements,
modifying the value of said central element in response thereto thereby providing enhancement of said image, displaying said enhanced image.

11. The method as claimed in claim 10 wherein said signal is a digital video type signal conveying said image in raster form,
and characterized by said recovering and temporarily storing digital data bytes corresponding to said picture elements to provide a matrix of stored elements with said central element being central to said matrix,
and determining if said neighboring elements match said known patterns of elements thereby indicating that modifying said central element is likely to enhance the perceived quality of said image when it is displayed.

12. The method as claimed in claim 10 wherein said signal is a digital signal representing said image in raster like form,
said recovering and temporarily storing digital data bytes corresponding to said picture elements to provide a matrix of M×N stored elements as said group with N being a number of lines of said raster and M being a number of elements in said lines and with said central element being central to said matrix,
and utilizing digital logic operations to compare the pattern formed by said central element and the remaining said neighboring elements with a plurality of predetermined digital logic patterns to determine if there are any matches therebetween said matches indicating that modifying said central element is likely to enhance the perceived quality of said image.

13. The method as claimed in claim 10 wherein said signal a digital signal representing said image in raster type form,
said recovering and temporarily storing digital data bytes corresponding to said picture elements to provide a matrix of M×N stored elements as said group with M being a number of elements in a line and N being a number of lines of said raster and with said central element being central to said matrix,
utilizing digital logic operations to compare said neighboring elements with a plurality of predetermined digital logic patterns to determine if modifying said central element is likely to enhance the perceived quality of said image,
and modifying the value of said central element whenever said modification is indicated to increase or decrease the brightness of said central element in response to said digital logic operations.

14. The method as claimed in claim 10 wherein said signal is a digital signal representing said image in raster type form,
said recovering and temporarily storing digital data bytes corresponding to said picture elements to provide a matrix of M×N stored elements as said group with M being a number of elements in a line and N being a number of lines of said raster and with said central element being central to said matrix,
utilizing digital logic operations to compare said neighboring elements with a plurality of predetermined digital logic patterns to determine if modifying said central element is likely to enhance the perceived quality of said image,
and modifying the value of said central element whenever said modification is indicated to modify the size and/or shape of the display of said central element in response to said digital logic operations.

15. The apparatus of claim 4 characterized in that said video fill circuit modifies the value of said central element includes replacing an existing image element.

16. The apparatus of claim 4 characterized in that said video fill signal can replicate an image element at a location where one was previously non-existent.

17. The apparatus of claim 4 characterized in that said fill signal replicates new image information utilizing surrounding image elements.

18. The apparatus of claim 4 characterized in that said fill calculator means utilizes multiple sets of image surrounding elements.

19. The apparatus of claim 18 characterized in that said fill calculator means includes ranking the multiple sets of surrounding image elements by similarity.

20. The apparatus of claim 19 characterized in that said fill calculator means discards dissimilar sets.

21. The apparatus of claim 4 characterized in that said video fill signal modulates said central element only sideways.

22. The apparatus of claim 4 characterized in that said video fill signal can alter the shape of said central element.

23. The apparatus of claim 4 characterized in that said video fill signal replicates additional elements.

24. The apparatus of claim 4 characterized in that said video fill signal replicates a defective element.

25. The apparatus of claim 4 characterized in that said neighboring element circuit provides pairs of elements.

26. The apparatus of claim 4 characterized in that said video fill circuit operates in real time on said central element of the image.

27. The apparatus of claim 4 characterized in that the display means includes a light beam and said video fill circuit deflects said light beam.

28. The apparatus of claim 4 characterized in that said central element is stored in a memory and said video fill circuit modifies the value of said central element as it is read out of said memory.

29. The method of claim 10 characterized in that said modifying the value of said central element includes replacing an existing image element.

30. The method of claim 10 characterized in that said modifying the value of said central element can replicate an image element at a location where one was previously non-existent.

31. The method of claim 10 characterized in that said modifying the value of said central element replicates new image information utilizing surrounding image.

32. The method of claim 10 characterized by storing said central element is stored in a memory and said modifying the value of said central element modifies the value of said central element as it is read out of said memory.

33. The method of claim 10 characterized in that said modifying the value of said central element modulates said central element only sideways.

34. The method of claim 10 characterized in that said modifying the value of said central element can alter the shape of said central element.

35. The method of claim 10 characterized in that said modifying the value of said central element replicates additional elements.

36. The method of claim 10 characterized in that said modifying the value of said central element replaces a defective element.

37. The method of claim 10 characterized in that said recovering and temporarily storing known ones of picture elements provides pairs of elements.

38. The method of claim 10 characterized in that said modifying the value of said central element operates in real time on said central element of the image.

* * * * *

(12) EX PARTE REEXAMINATION CERTIFICATE (6972nd)
United States Patent
Cooper

(10) Number: US 6,870,964 C1
(45) Certificate Issued: Aug. 4, 2009

(54) SPATIAL SCAN REPLICATION CIRCUIT

(75) Inventor: Carl Cooper, Monte Sereno, CA (US)

(73) Assignee: Pixel Instruments Corp., Los Gatos, CA (US)

Reexamination Request:
No. 90/009,001, Jan. 28, 2008

Reexamination Certificate for:
Patent No.: 6,870,964
Issued: Mar. 22, 2005
Appl. No.: 09/573,284
Filed: May 18, 2000

Related U.S. Application Data

(62) Division of application No. 08/398,383, filed on Mar. 3, 1995, now Pat. No. 6,529,637, which is a continuation-in-part of application No. 08/119,610, filed on Sep. 13, 1993, now Pat. No. 5,424,780, which is a continuation of application No. 07/355,461, filed on May 22, 1989, now abandoned.

(51) Int. Cl.
*H04N 7/01* (2006.01)
*H04N 3/10* (2006.01)
*H04N 1/409* (2006.01)
*H04N 3/26* (2006.01)
*H04N 1/04* (2006.01)
*H04N 3/34* (2006.01)
*H04N 1/113* (2006.01)

(52) U.S. Cl. .................. 382/254; 382/267; 348/607; 348/E3.048; 348/E3.053; 348/E7.012; 358/1.2

(58) Field of Classification Search .................. None
See application file for complete search history.

(56) References Cited

U.S. PATENT DOCUMENTS

| | | |
|---|---|---|
| 2,921,128 A | 1/1960 | Gibson |
| 3,009,016 A | 11/1961 | Graham |
| 3,479,453 A | 11/1969 | Townsend |
| 3,568,163 A | 3/1971 | Osborne |
| 3,573,789 A | 4/1971 | Sharp |
| 3,680,076 A | 7/1972 | Duffek et al. |
| 3,700,812 A | 10/1972 | Springett |
| 3,718,833 A | 2/1973 | Martone et al. |
| 3,737,855 A | 6/1973 | Cutara |
| 3,786,478 A | 1/1974 | King, Jr. |
| 3,788,478 A | 1/1974 | King, Jr. |
| 3,875,584 A | 4/1975 | Fletcher |
| 3,878,536 A | 4/1975 | Gilliam |
| 3,914,538 A | 10/1975 | Perreault et al. |
| 3,921,164 A | 11/1975 | Anderson |

(Continued)

FOREIGN PATENT DOCUMENTS

| | | |
|---|---|---|
| EP | 0192 292 | 8/1986 |
| EP | 0192292 A1 | 8/1986 |
| EP | 0 192 292 A1 | 8/1986 |
| EP | 0 192 292 1 B | 8/1986 |
| FR | 2269270 | 11/1975 |
| GB | 2197152 A | 5/1988 |
| JP | 56-140461 | 11/1981 |
| JP | 58-75192 | 5/1983 |
| JP | 58-160986 | 9/1983 |
| JP | 58-162984 | 9/1983 |

(Continued)

OTHER PUBLICATIONS

J. R. Kinghorn, "Character Rounding for Alphanumeric Video Display," Mullard Technical Communications, No. 126, Apr. 1976, pp. 230–239.

M. A. Isnardi, "Modeling the Television Process," Ph.D. Thesis, Massachusetts Institute of Technology, May 1986.

G. Goertzel and G. R. Thompson, "Digital halftoning on the IBM 4250 Printer," IBM J. Res. Develop., vol. 31, No. 1, Jan. 1987, pp. 2–15.

(Continued)

*Primary Examiner*—Colin M Larose

(57) ABSTRACT

In an image replication circuit, the improvement of replicating a given element at a certain location with the most similar of surrounding sets of image elements.

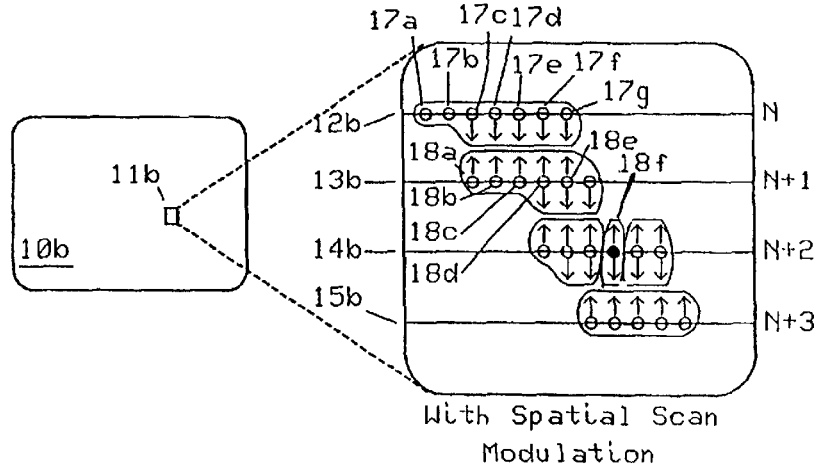

U.S. PATENT DOCUMENTS

| | | | |
|---|---|---|---|
| 3,946,266 A | 3/1976 | Saito et al. | |
| 3,949,166 A | 4/1976 | Fuse | |
| 3,952,296 A | 4/1976 | Bates | |
| 3,961,223 A | 6/1976 | Ray et al. | |
| 3,969,716 A | 7/1976 | Roberts | |
| 3,980,819 A | 9/1976 | Schwartz | |
| 3,995,108 A | 11/1976 | Morrison | |
| 4,009,334 A | 2/1977 | Sypula | |
| 4,018,990 A | 4/1977 | Long | |
| 4,032,977 A * | 6/1977 | Liao | 382/238 |
| 4,034,408 A | 7/1977 | Starkweather | |
| 4,038,668 A | 7/1977 | Quarton | |
| 4,047,248 A | 9/1977 | Lyman et al. | |
| 4,050,084 A | 9/1977 | Rossi | |
| 4,058,836 A | 11/1977 | Drewery | |
| 4,063,232 A | 12/1977 | Fernald | |
| 4,064,530 A | 12/1977 | Kaiser et al. | |
| 4,068,310 A | 1/1978 | Friauf | |
| 4,072,984 A | 2/1978 | Kaiser | |
| 4,079,367 A | 3/1978 | Yonezawa et al. | |
| 4,095,216 A | 6/1978 | Spicer | |
| 4,109,276 A | 8/1978 | Hopkins, Jr. | |
| 4,110,785 A | 8/1978 | Dischert | |
| 4,119,954 A | 10/1978 | Seitz et al. | |
| 4,119,956 A | 10/1978 | Murray | |
| 4,124,870 A | 11/1978 | Schatz et al. | |
| 4,152,697 A | 5/1979 | Rider et al. | |
| 4,198,154 A | 4/1980 | Masegi et al. | |
| 4,240,105 A | 12/1980 | Faroudja | |
| 4,240,113 A | 12/1980 | Michael et al. | |
| 4,241,341 A | 12/1980 | Thorson | |
| 4,251,871 A | 2/1981 | Yu | |
| 4,268,871 A | 5/1981 | Kawamura | |
| 4,279,002 A | 7/1981 | Rider | |
| 4,282,546 A | 8/1981 | Reitmeier | |
| 4,293,202 A | 10/1981 | Ohnishi et al. | |
| 4,314,154 A | 2/1982 | Minoura et al. | |
| 4,322,750 A | 3/1982 | Lord et al. | |
| 4,355,337 A | 10/1982 | Sekigawa | |
| 4,356,475 A | 10/1982 | Neumann et al. | |
| 4,356,555 A | 10/1982 | Ejiri et al. | |
| 4,361,394 A | 11/1982 | Sakai et al. | |
| 4,361,853 A | 11/1982 | Remy et al. | |
| 4,364,090 A | 12/1982 | Wendland | |
| 4,367,533 A | 1/1983 | Wiener | |
| 4,375,079 A | 2/1983 | Ricketts et al. | |
| 4,386,272 A | 5/1983 | Check, Jr. et al. | |
| 4,386,367 A * | 5/1983 | Peterson et al. | 348/446 |
| 4,387,272 A | 6/1983 | Castro et al. | |
| 4,389,668 A | 6/1983 | Favreau | |
| 4,400,719 A | 8/1983 | Powers | |
| 4,409,591 A | 10/1983 | Simkovitz | |
| 4,415,931 A | 11/1983 | Dischert | |
| 4,419,693 A | 12/1983 | Wilkinson | |
| 4,435,792 A | 3/1984 | Bechtolsheim | |
| 4,437,122 A | 3/1984 | Walsh et al. | |
| 4,450,483 A | 5/1984 | Coviello | |
| 4,460,909 A | 7/1984 | Bassetti et al. | |
| 4,464,686 A | 8/1984 | Reitmeier | |
| 4,468,706 A | 8/1984 | Cahill | |
| 4,481,594 A | 11/1984 | Staggs et al. | |
| 4,484,230 A | 11/1984 | Pugsley | |
| 4,485,402 A | 11/1984 | Serby | |
| 4,506,382 A | 3/1985 | Hada et al. | |
| 4,506,587 A | 3/1985 | Tanaka | |
| 4,517,607 A | 5/1985 | Ohkouchi et al. | |
| 4,521,803 A | 6/1985 | Gittinger | |
| 4,527,145 A | 7/1985 | Hausmann | |
| 4,533,951 A | 8/1985 | Powers | |
| 4,544,264 A | 10/1985 | Bassetti et al. | |
| 4,544,922 A | 10/1985 | Watanabe et al. | |
| 4,560,980 A | 12/1985 | Tillich | |
| 4,563,056 A | 1/1986 | Tagawa et al. | |
| 4,573,070 A | 2/1986 | Cooper | |
| 4,578,689 A | 3/1986 | Spencer et al. | |
| 4,589,012 A | 5/1986 | Songer | |
| 4,613,877 A | 9/1986 | Spencer et al. | |
| 4,616,219 A | 10/1986 | Tanaka et al. | |
| 4,620,217 A | 10/1986 | Songer | |
| 4,623,922 A | 11/1986 | Wischermann | |
| 4,625,219 A | 11/1986 | Horiuchi | |
| 4,625,222 A | 11/1986 | Bassetti et al. | |
| 4,626,838 A | 12/1986 | Tsujioka et al. | |
| 4,630,309 A | 12/1986 | Karow | |
| 4,636,857 A | 1/1987 | Achiha et al. | |
| 4,639,766 A | 1/1987 | Schine | |
| 4,642,622 A | 2/1987 | Ito et al. | |
| 4,646,076 A | 2/1987 | Wiedenman et al. | |
| 4,646,355 A | 2/1987 | Petrick et al. | |
| 4,648,045 A | 3/1987 | Demetrescu | |
| 4,648,119 A | 3/1987 | Wingfield et al. | |
| 4,651,169 A | 3/1987 | Muka | |
| 4,656,514 A | 4/1987 | Wilkinson et al. | |
| 4,661,850 A | 4/1987 | Strolle et al. | |
| 4,672,369 A | 6/1987 | Preiss et al. | |
| 4,673,978 A | 6/1987 | Dischert et al. | |
| 4,675,735 A | 6/1987 | Wilkinson et al. | |
| 4,677,493 A | 6/1987 | Shinya | |
| 4,679,039 A | 7/1987 | Neil et al. | |
| 4,679,086 A | 7/1987 | May | |
| 4,684,937 A | 8/1987 | Schine | |
| 4,697,177 A | 9/1987 | Schine | |
| 4,698,664 A | 10/1987 | Nichols | |
| 4,698,675 A | 10/1987 | Casey | |
| 4,698,843 A | 10/1987 | Burt et al. | |
| 4,703,318 A | 10/1987 | Haggerty | |
| 4,703,363 A | 10/1987 | Kitamura | |
| 4,703,513 A | 10/1987 | Gennery | |
| 4,704,605 A | 11/1987 | Edelson | |
| 4,707,715 A | 11/1987 | Miura | |
| 4,710,799 A | 12/1987 | Songer | |
| 4,713,672 A | 12/1987 | Horihata et al. | |
| 4,715,006 A | 12/1987 | Nagata | |
| 4,719,509 A | 1/1988 | Sakamoto | |
| 4,720,705 A | 1/1988 | Gupta et al. | |
| 4,720,745 A | 1/1988 | DeForest et al. | |
| 4,723,163 A | 2/1988 | Skinner | |
| 4,723,166 A | 2/1988 | Stratton | |
| 4,725,966 A | 2/1988 | Darby et al. | |
| 4,725,967 A | 2/1988 | Aiba | |
| 4,731,648 A | 3/1988 | Bernard et al. | |
| 4,734,715 A | 3/1988 | Shiraishi | |
| 4,737,858 A | 4/1988 | DeBaryshe | |
| 4,742,363 A | 5/1988 | Shiraishi | |
| 4,758,965 A | 7/1988 | Liang et al. | |
| 4,761,819 A | 8/1988 | Denison | |
| 4,780,711 A | 10/1988 | Doumas | |
| 4,783,840 A | 11/1988 | Song | |
| 4,786,923 A | 11/1988 | Shimizu | |
| 4,786,963 A | 11/1988 | McNeely | |
| 4,791,582 A | 12/1988 | Ueda et al. | |
| 4,791,679 A | 12/1988 | Barski | |
| 4,805,117 A | 2/1989 | Fiore et al. | |
| 4,805,226 A | 2/1989 | Guebey | |
| 4,809,021 A | 2/1989 | Check et al. | |
| 4,812,783 A | 3/1989 | Honjo | |
| 4,816,905 A | 3/1989 | Tweedy et al. | |
| 4,817,175 A | 3/1989 | Tenenbaum et al. | |
| 4,843,380 A | 6/1989 | Oakley et al. | |
| 4,847,641 A | 7/1989 | Tung | |
| 4,851,909 A | 7/1989 | Noske et al. | |

| | | | | | | |
|---|---|---|---|---|---|---|
| 4,853,970 A | 8/1989 | Ott | | 6,215,526 B1 | 4/2001 | Barton et al. |
| 4,860,119 A | 8/1989 | Maniwa | | 6,233,389 B1 | 5/2001 | Barton et al. |
| 4,870,599 A | 9/1989 | Hempel et al. | | 6,310,886 B1 | 10/2001 | Barton |
| 4,870,611 A | 9/1989 | Martin et al. | | 6,324,337 B1 | 11/2001 | Goldwasser |
| 4,897,805 A | 1/1990 | Wang | | 6,324,338 B1 | 11/2001 | Wood et al. |
| 4,905,166 A | 2/1990 | Schuerman | | 6,327,418 B1 | 12/2001 | Barton |
| 4,908,866 A | 3/1990 | Goldwasser et al. | | | | |
| 4,914,459 A | 4/1990 | Mama et al. | | | | |

FOREIGN PATENT DOCUMENTS

| | | |
|---|---|---|
| JP | 59210774 | 11/1984 |
| JP | 60-202474 | 10/1985 |
| JP | 60-204177 | 10/1985 |
| JP | 60-206318 | 10/1985 |
| JP | 61-75682 | 4/1986 |
| JP | 61-156980 | 7/1986 |
| JP | 61-214073 | 9/1986 |
| JP | 61-214661 | 9/1986 |
| JP | 62-20076 | 1/1987 |
| JP | 62-140182 | 6/1987 |
| JP | 62-43989 | 9/1987 |
| JP | 62-232087 | 10/1987 |
| JP | 62-274472 | 11/1987 |
| JP | 62-279477 | 12/1987 |
| JP | 62-296280 | 12/1987 |
| JP | 63-18877 | 1/1988 |
| JP | 63-24369 | 2/1988 |
| JP | 63-38381 | 2/1988 |
| JP | 63038381 | 2/1988 |
| JP | 63048088 | 2/1988 |
| JP | 63-73479 | 4/1988 |
| JP | 63-82077 | 4/1988 |
| JP | 63-138876 | 6/1988 |
| JP | 63-213084 | 9/1988 |
| JP | 63-245174 | 10/1988 |
| JP | 63-307954 | 12/1988 |
| JP | 01-84385 | 3/1989 |
| JP | 1084385 | 3/1989 |
| JP | 64-77384 | 3/1989 |
| JP | 1-125070 | 5/1989 |
| JP | 2-131689 | 5/1990 |
| JP | 2-177683 | 7/1990 |
| JP | 6-133280 | 5/1994 |
| JP | 6-153169 | 5/1994 |
| WO | WO 9222060 | 12/1992 |
| WO | WO9222060 | 12/1992 |

Remaining U.S. patents:

| | | |
|---|---|---|
| 4,920,491 A | 4/1990 | Eberhard et al. |
| 4,926,248 A | 5/1990 | Kobayashi et al. |
| 4,933,689 A | 6/1990 | Yoknis |
| 4,941,045 A | 7/1990 | Birch |
| 4,941,186 A | 7/1990 | Massmann et al. |
| 4,952,921 A | 8/1990 | Mosier |
| 4,965,678 A | 10/1990 | Yamada |
| 4,985,764 A | 1/1991 | Sato |
| 4,989,090 A | 1/1991 | Campbell |
| 4,992,804 A | 2/1991 | Roe |
| 4,992,874 A | 2/1991 | Willis |
| 5,005,139 A | 4/1991 | Tung |
| 5,019,903 A | 5/1991 | Dougall et al. |
| 5,023,919 A | 6/1991 | Wataya |
| 5,029,108 A | 7/1991 | Lung |
| 5,032,899 A | 7/1991 | Sato |
| 5,047,955 A | 9/1991 | Shope |
| 5,068,914 A | 11/1991 | Klees |
| 5,072,291 A | 12/1991 | Sekizawa |
| 5,087,973 A | 2/1992 | Kawahara |
| 5,097,517 A | 3/1992 | Holt |
| 5,099,319 A | 3/1992 | Esch et al. |
| 5,101,274 A | 3/1992 | Yoshimura |
| 5,132,992 A | 7/1992 | Yurt et al. |
| 5,133,079 A | 7/1992 | Ballantyne et al. |
| 5,146,333 A | 9/1992 | Chaplin |
| 5,182,633 A | 1/1993 | Antonio et al. |
| 5,229,868 A | 7/1993 | Kanno et al. |
| 5,241,428 A | 8/1993 | Goldwasser et al. |
| 5,287,420 A | 2/1994 | Barrett |
| 5,294,984 A | 3/1994 | Mori |
| 5,303,326 A | 4/1994 | Deal et al. |
| 5,353,121 A | 10/1994 | Young et al. |
| 5,365,604 A | 11/1994 | Kwok |
| 5,387,943 A | 2/1995 | Silver |
| 5,392,075 A | 2/1995 | Gai |
| 5,406,626 A | 4/1995 | Ryan |
| 5,408,329 A | 4/1995 | Mailloux |
| 5,424,780 A | 6/1995 | Cooper |
| 5,430,485 A | 7/1995 | Lankford et al. |
| 5,442,407 A | 8/1995 | Iu |
| 5,442,636 A | 8/1995 | Bontekoe |
| 5,504,815 A | 4/1996 | Ryan et al. |
| 5,523,796 A | 6/1996 | Marshall et al. |
| 5,524,051 A | 6/1996 | Ryan |
| 5,544,262 A | 8/1996 | Pagallo |
| 5,544,264 A | 8/1996 | Bellegarda |
| 5,555,463 A | 9/1996 | Staron |
| 5,563,963 A | 10/1996 | Kaplan |
| 5,583,937 A | 12/1996 | Ullrich et al. |
| 5,590,195 A | 12/1996 | Ryan |
| 5,710,601 A | 1/1998 | Marshall et al. |
| 5,802,240 A | 9/1998 | Asai |
| 5,815,671 A | 9/1998 | Morrison |
| 5,838,298 A | 11/1998 | Shirasaka |
| 5,877,815 A | 3/1999 | Tsujimura |
| 5,887,114 A | 3/1999 | Nakantani et al. |
| 5,893,062 A | 4/1999 | Bhadkamkar et al. |
| 5,940,190 A | 8/1999 | Overall et al. |
| 5,970,205 A | 10/1999 | Nakamura et al. |
| RE36,801 E | 8/2000 | Logan et al. |
| 6,133,957 A | 10/2000 | Campbell |
| 6,181,383 B1 | 1/2001 | Fox et al. |

OTHER PUBLICATIONS

*IP Innovation L.L.C., Technology Licensing Corporation, New Medium Technologies LLC and AV Technologies, LLC vs. Sony Electronics, Inc.*, Memorandum Opinion and Order, Aug. 18, 2005 [Claim Construction], Case No. 04 C 6388, Judge Kennelly, Dist. Ct. N.D. of ILL, E.D., 39 pgs.

Randolph Sanders et al., Behind Hewlett–Packard's Patent on Resolution Enhancement Technology, 1997.

Richard Iredale, High Definition NTSC Broadcast Protocol, 1987.

S. Naimpally, Integrated Ditigital IDTV Receiver with Features, Aug. 1988.

J.R. Kinghorn, Character Rounding for Alphanumeric Video Display, Apr. 1975.

Y.L. Yao, High Resolution Display and Printing Technique, Apr. 1981.

Allen Tucker, The Computer Science and Engineering Handbook, Second Edition, CD–ROM.

J.M. Fleisher et al., Laser Optical System of the IBM 3800 Printer, Sep. 1977.

IBM Technical Disclosure Bulletin, Raster Scanned CRT Spot Shaping, Jun. 1979, pp. 327, 373.

"Interfaced to Sequential Conversion for EDTA Applications," by T. Doyle, Proceedings of the Second International Workshop on Signal Processing of HDTV, 1988.

"Raster Scanned CRT Spot Shaping," A. S. Murphy, IBM Technical Disclosure Bulletin, Jun. 1979, pp. 372–373.

"Improvement of Digital Typeface Printing," IBM Technical Disclosure Bulletin, Feb. 1985, pp. 5047–5048.

"The Computer Science and Engineering Handbook," by Allen Tucker, Jun. 19, 1997.

"Adaptive Intra–Field Progressive Scan Converter," by Sato et al., 1989 National Convention of the Institute of Television Engineers of Japan (ITEJ). (English Translation also attached).

Zue, Kefu; Winans, Ann; Walowil, Eric, An Edge–restricted special interpolation Algorithm, Journal of Electronic Imaging, 1(2), 152–161 (BAR–003386–95).

Jensen, Kris, Anastasslou, Dimitris, "Spatial Resolution Enhancement of Images Using Nonlinear Interpolation," 1990 International Conference on Acoustics, Speech and Signal Processing (Apr. 1990) (BAR–003365–69).

Masuda, Michio, Okamoto, Kaneyuki, Nishijima, Hideo; Ono, Koichi, Otsubo, Hiroyasu, Otsuka, Susumu, "Picture in Picture System with a Digital Memory for VCRS," IEEE Transactions of Consumer Electronics, vol. CE–33, No. 3 (Aug. 1987) (BAR–00370–79).

* cited by examiner

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 10 is cancelled.

New claims 39–47 are added and determined to be patentable.

Claims 1–9 and 11–38 were not reexamined.

*39. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, wherein at least one of the neighboring elements is temporally different from another of the neighboring elements.*

*40. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, wherein the enhancement comprises filling a temporal void.*

*41. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, wherein the modifying comprises replicating the central element in at least a time dimension.*

*42. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, wherein at least two of the neighboring elements are from different frames of the image.*

*43. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, generating at least one new line that is inserted in said enhanced image, said new line being temporally located between existing lines of said image.*

*44. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, generating at least one new row that is inserted in said enhanced image and wherein said new row is temporally located between existing rows of said image.*

*45. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, generating at least one new field for said enhanced image, wherein said new field is temporally located between fields of said image.*

*46. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image, generating at least one new frame for said enhanced image, wherein said new frame is temporally located between frames of said image.*

*47. A method for displaying an enhanced version of an image conveyed by a signal, said method including recovering and temporarily storing known ones of picture elements of said image so as to provide a group of neighboring elements including a central element, determining if said neighboring elements, including said central element, match known patterns of elements, modifying the value of said central element in response thereto thereby providing enhancement of said image, displaying said enhanced image wherein the enhancement comprises improving temporal resolution.*

* * * * *